Patented Mar. 18, 1947

2,417,748

UNITED STATES PATENT OFFICE 2,417,748

PREPARATION OF METHYL ACRYLATE

Hugh J. Hagemeyer, Jr., Kingsport, Tenn., assignor to Eastman Kodak Company, Rochester, N. Y., a corporation of New Jersey No Drawing. Application December 23, 1943, Serial No. 515,422

2 Claims. (Cl. 260—486)

This invention relates to improvements in the production of unsaturated esters and nitriles by the pyrolysis of the esters, amides, or ammonium salts of the hydroxy monocarboxylic aliphatic acids in the presence of ketene.

It is known that unsaturated acids may be produced by the dehydration of monocarboxylic hydroxy acids and their esters, or by the elimination of hydrogen halides from halogen derivatives of the monocarboxylic acids. Difficulties, however, have been experienced in previous processes of this nature. The preparation of α-methyl acrylic acid by the dehydration of α-hydroxyisobutyric acid with $P_2O_5$ is known. This method, however, has not been suitable for technical adoption, some of the reasons being that low yields are obtained and contamination with decomposition products is experienced.

The preparation of unsaturated acid esters by the use of acetoxy derivatives in vapor phase decomposition has been proposed. For instance, α-acetoxy methyl propionate has been decomposed by vapor phase decomposition to give methyl acrylate. The cost of preparation and purification of the acetoxy derivative has prevented any widespread adoption of this method of preparing unsaturated compounds. Processes have been proposed for preparing unsaturated acids or their derivatives in which α-hydroxymonocarboxylic acids or esters were subjected to the use of ordinary dehydration catalysts. The application of heat in such a process leads to the formation of lactides, which, on further heating, break down to give an aldehyde or ketone and carbon monoxide. In the case of esters, some ester interchange also occurs. For instance, ethyl lactate gives considerable ethyl lactyl lactate by heating at elevated temperatures.

One object of my invention is to prepare α,β-unsaturated esters or nitriles directly from the corresponding α-hydroxy compounds. Another object of my invention is to provide a method of accomplishing this dehydration by a one-step reaction in the vapor phase in the presence or absence of diluents. A further object of this invention is to provide a process for making unsaturated compounds in which only inexpensive and readily available raw materials are employed. A still further object of the invention is to provide a process in which the by-products obtained are suitable for use in subsequent reactions.

I have found that by subjecting α-hydroxymonocarboxylic esters, nitriles, amides or ammonium salts to pyrolysis, together with ketene either in the presence or absence of diluents dehydration in the vapor phase of the lower molecular weight α-hydroxy aliphatic acid derivatives will occur to give the corresponding α,β-unsaturated compound. My invention in its broader aspects comprises the passage of a mixture of the α-hydroxy compound and ketene in gaseous form through a pyrolysis tube whereby dehydration occurs. I have found that compounds having the following formula may be employed as the starting material to be dehydrated in accordance with my invention:

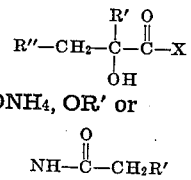

X being $NH_2$, $ONH_4$, $OR'$ or $$NH-\overset{O}{\overset{\|}{C}}-CH_2R'$$

R' and R" being alkyl or hydrogen substituents.

My invention is particularly adapted for the dehydration of low molecular weight compounds of the formula stated such as compounds having not more than 8 carbon atoms in a straight chain therein.

I have found that unsaturated nitriles may also be obtained by pyrolysis of saturated α-hydroxy aliphatic nitriles such as α-hydroxy isobutyro nitrile with ketene.

In carrying out the invention other than atmospheric pressures may be used although I have found that the reaction works satisfactorily under ordinary pressure conditions. It is desirable that the temperature in the pyrolysis tube be between 400 and 600° C., the best results having been obtained in my work at approximately 550° C. The dehydration is conveniently carried out by passing the α-hydroxy compound to be dehydrated through a heated tube together with ketene. The α-hydroxy compound and the ketene may be in pure condition or there may be other materials present or the α-hydroxy compound may be made up of a mixture of several materials of this nature. It is often desirable to use ketene which has decomposition gases present therein as it has been found that these gases ordinarily assist in sweeping the pyrolysis chamber. If desired, diluents may be added to the material passing through the pyrolysis tube. For instance, it is particularly desirable in some cases that acetic anhydride vapors also accompany the vapors of the ketene and the α-hydroxy compound. In many cases the use of an acetic anhydride diluent has suppressed the formation of undesirable by-products and increased the conversion of the α-hydroxy compound to the unsaturated compound on a single passage through the pyrolysis tube. The pyrolysis tube, in general, takes the form of a vessel of tubular shape provided with means for keeping it at a substantially steady temperature. It is also desirable that the tube be packed with some inert material giving high contact surface such as quartz, pyrex chips, silica gel, carbon rods or the like. The dimensions of the tube and the rate at which the materials are supplied thereto are dependent upon each other and the length of tube which is most convenient is a question of choice of the individual operator. Processes of this type heretofore have employed tubes 40 inches long with an internal diameter of one inch packed with ½ inch mesh particles. With a tube of this size the materials have been allowed to run in at the rate of 5 grams per minute. With a longer tube or one in which the gases contact more space in a given amount of time the rate at which the gases are led into the tube may be increased and vice versa. My process may be carried out continuously by leading the mixture of ketene and α-hydroxy compound into the heated tube at one end and withdrawing the pyrolysis products at the other. In addition to the contact surface and free space, the temperature employed in the tube also has an influence on the rate at which the vapors are led through the tube to obtain the best results. If the vapors are led through too fast the temperature is lowered unduly so that the materials to react are not subjected to the required temperature for reaction or if they are, are not at that temperature for the desired time. The best results in accordance with my process have been obtained in a pyrolysis tube in which the ratio of the volume of the contact material to the free space therein is approximately 3 to 1.

The materials employed as the starting material in my process may be characterized as esters, nitriles, amides or ammonium salts of mono- or dialkyl glycollic acids. For instance, some of the compounds which may be employed with ketene in my process are methyl lactate, ethyl lactate, α-hydroxymethylisobutyrate, lactic amide, ammonium lactate, lactic amide-ammonium lactate mixture, α-hydroxyisobutyronitrile, N-acetyl α-hydroxyisobutyramide, methyl-α-hydroxy isobutyrate or, as a matter of fact, any of the lower molecular weight compounds which correspond to the formula given herein. The reaction in accordance with my invention I have found to be characteristic of the compounds of this type.

It is desirable in the carrying out of my process in most cases that the material which is employed is in concentrated form and free of water. As pointed out above, this is a dehydration operation and the presence of water serves no useful purpose and oftentimes interferes with the obtaining of the best results. In addition, it may cut down the rate of conversion of the pyrolysis process even in cases where it is not objectionable. The following examples illustrate my invention:

*Example 1*

Methyl lactate vapors and ketene in the molar ratio of 1 to 1.5 were passed through a cracking tube at a temperature of 550° C. using a contact time of 6.4 seconds. One mole of methyl lactate gave 28 grams of methyl acrylate along with some acetaldehyde.

*Example 2*

One mole of methyl lactate and one mole of acetic anhydride were preheated to 140–150° C. and passed into a tube filled with pyrex rings at 550° C. Ketene was passed in at a molar ratio of 1 to 1 of methyl lactate. The contact time was 4 seconds. Distillation of the product gave 30 grams of methyl acrylate and no low boilers. The residue, upon being repassed, gave 40 grams of methyl acrylate. A yield of 81% was obtained.

*Example 3*

One mole of methyl lactate and 2 moles of acetic anhydride were preheated at 150° C. and passed into a tube filled with pyrex chips at 550° C. Ketene was passed in at a molar ratio of 1.2 to 1 of methyl lactate. The distillation gave 64 grams of methyl acrylate. The contact time was 4 seconds.

*Example 4*

One mole of lactic amide and one mole of acetic anhydride were heated to gentle boiling and a homogeneous solution was formed. This solution was preheated at 140–150° C. and passed through the tube at 550° C. using a 6 second contact time and a 2 to 1 molar ratio of ketene to amide. The resulting product was distilled giving 35 grams of acrylonitrile which is a conversion of 67%. The residue was subjected to pyrolysis to get more acrylonitrile.

*Example 5*

100 grams of lactic amide-ammonium lactate mixture and 200 grams of acetic anhydride were heated to form a solution. This solution was preheated to 150° C. and passed through the pyrolysis chamber at 530° C. using a 4 second contact time together with ketene in a molar ratio of ketene to amide of 2 to 1. Distillation of the resulting product gave 27 grams of acrylonitrile.

*Example 6*

250 grams of ammonium lactate-lactic amide and 250 grams of acetic anhydride were heated to form a solution. This was preheated at 140° C. and passed into the tube together with ketene which tube had a temperature of 550° C. The ketene was present in a 1 to 1 molar ratio to the amide. The contact time was 6 seconds. The resulting product was distilled and yielded 50 grams of acrylonitrile.

*Example 7*

250 grams of ammonium lactate-lactic amide and 500 grams of acetic anhydride were heated to form a solution. This was preheated at 140–150° C. and mixed with ketene and pyrolyzed at 520–530° C. using a six second contact time. The molar ratio of ketene to amide was 1.5 to 1. The resulting product was distilled and gave 84 grams of acrylonitrile.

*Example 8*

5 moles of methyl lactate and 10 moles of anhydrous ammonia were autoclaved at 100° C. to form the amide. Excess ammonia and methanol were removed by vacuum distillation. The amide was dissolved in 5 moles of hot acetic anhydride. The mixture was heated at 160° C. and together with ketene was passed through a column and into a pyrolysis tube full of pyrex chips at a temperature of 550° C. using a 6 second contact time. The yield obtained was 170 grams of acrylonitrile.

*Example 9*

1 mole of lactic amide was passed into a pyrolysis tube in molten condition and preheated to 150–160° C. Ketene gas was passed through the pyrolysis chamber in the ratio of 2 to 1 to the amide. The pyrolysis was carried out at 550° C. using a 4 second contact time. The pyrolysis chamber was packed with pyrex rings. The product was distilled giving 15 grams of acrylonitrile having a boiling point of 78° C. at 760 mm. pressure. 50 grams of α-acetoxypropionitrile were also recovered.

*Example 10*

1 mole of lactic amide in molten condition was passed into the pyrolysis chamber and preheated to 140–160° C. Ketene was passed through the pyrolysis chamber in the ratio of 4 to 1. The contact time was 5 seconds and nitrogen was also passed through at the rate of 3 cubic feet per hour. The pyrolysis was carried out at 520° C. Distillation gave 18 grams of acrylonitrile and 70 grams of higher boiling material.

*Example 11*

170 grams of α-hydroxyisobutyrnitrile (acetone cyanohydrin) was dropped through a preheater at a temperature of 160° C. into a pyrolysis chamber packed with pyrex rings. Ketene was then passed through the pyrolysis tube in the ratio of 2 to 1. The temperature was maintained at 475° C. and the contact time was 4 seconds and the flow of nitrogen was 4 cubic feet per hour. The yield was 22% of α-methyl acrylonitrile.

I claim:

1. A method of preparing methyl acrylate which comprises subjecting a mixture of ketene and methyl lactate to pyrolysis at a temperature of 400 to 600° C.

2. A method of preparing methyl acrylate which comprises subjecting a mixture of ketene and methyl lactate to pyrolysis at a temperature of 400–600° C. in the absence of a catalyst.

HUGH J. HAGEMEYER, Jr.

REFERENCES CITED

The following references are of record in the file of this patent:

UNITED STATES PATENTS

| Number | Name | Date |
|---|---|---|
| 2,183,357 | Ritchie et al. | Dec. 12, 1939 |
| 2,208,328 | Lichty | July 16, 1940 |
| 2,264,026 | Gudgeon | Nov. 25, 1941 |
| 2,121,551 | Rigby | June 21, 1938 |
| 2,150,507 | Kropa | Mar. 14, 1939 |
| 2,305,663 | Beer | Dec. 22, 1942 |
| 1,993,736 | Graves et al. | Mar. 12, 1935 |
| 2,236,516 | Cahn et al. | Apr. 1, 1941 |
| 2,356,247 | Kirk et al. | Aug. 22, 1944 |
| 2,108,829 | Sixt et al. | Feb. 22, 1938 |

OTHER REFERENCES

Karrer, Organic Chemistry, 1938, p. 198.
Van der Burg, Rec. Trav. Chim., vol. 41 (1922), p. 23.